(12) United States Patent
Yu et al.

(10) Patent No.: US 12,608,006 B2
(45) Date of Patent: Apr. 21, 2026

(54) RANGING METHOD AND APPARATUS, ROBOT, AND STORAGE MEDIUM

(71) Applicant: Beijing Roborock Innovation Technology Co., Ltd., Beijing (CN)

(72) Inventors: Yang Yu, Beijing (CN); Zhen Wu, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 468 days.

(21) Appl. No.: 18/023,846

(22) PCT Filed: Apr. 8, 2021

(86) PCT No.: PCT/CN2021/085877
§ 371 (c)(1),
(2) Date: Feb. 28, 2023

(87) PCT Pub. No.: WO2022/041737
PCT Pub. Date: Mar. 3, 2022

(65) Prior Publication Data
US 2024/0028044 A1     Jan. 25, 2024

(30) Foreign Application Priority Data

Aug. 28, 2020     (CN) .......................... 202010887031.9

(51) Int. Cl.
*G05D 1/00*        (2024.01)
*G01C 3/14*        (2006.01)
(Continued)

(52) U.S. Cl.
CPC ............. *G05D 1/0251* (2013.01); *G01C 3/14* (2013.01); *G06T 7/55* (2017.01); *G06T 7/74* (2017.01);
(Continued)

(58) Field of Classification Search
CPC ........... G05D 1/0251; G06T 7/55; G06T 7/74; G06V 10/25; G06V 20/50; G01C 3/14
See application file for complete search history.

(56) References Cited

U.S. PATENT DOCUMENTS 9,400,503  B2 *  7/2016  Kearns ................... B25J 19/023
2003/0209633  A1   11/2003  Thal et al.

FOREIGN PATENT DOCUMENTS

CN        103054522 A        4/2013
CN        105627932 A        6/2016
(Continued)

OTHER PUBLICATIONS

Office Action dated Aug. 4, 2021, issued in corresponding Chinese Patent Application No. 202010887031.9.
(Continued)

*Primary Examiner* — Matthew C Bella
*Assistant Examiner* — Jinsu Hwang
(74) *Attorney, Agent, or Firm* — Morgan, Lewis & Bockius LLP

(57)        ABSTRACT

A ranging method includes determining a first distance of the object to be measured relative to the self-mobile robot, where content in the first image comprises at least the object and a surface on which the object is located; selecting a point located on the object from the first image as a 5 reference point; determining initial parallax based on the first distance; and determining a region of interest from a second image collected by a second image collection apparatus, and determining a location of the reference point from the region of interest as a first target point; determining a second target point from the region of interest based on the first target point, and determining an actual parallax distance between the first image collection apparatus and the second image
(Continued)

collection apparatus; and calculating depth information of the object based on the actual parallax distance.

18 Claims, 7 Drawing Sheets

(51) Int. Cl.

| | | |
|---|---|---|
| *G06T 7/55* | (2017.01) | |
| *G06T 7/73* | (2017.01) | |
| *G06V 10/25* | (2022.01) | |
| *G06V 20/50* | (2022.01) | |

(52) U.S. Cl.

CPC .............. *G06V 10/25* (2022.01); *G06V 20/50* (2022.01); *G06T 2207/30168* (2013.01)

(56) References Cited

FOREIGN PATENT DOCUMENTS

| | | | |
|---|---|---|---|
| CN | 105719290 A | 6/2016 | |
| CN | 106657600 A | 5/2017 | |

| | | | | |
|---|---|---|---|---|
| CN | 107277367 A | 10/2017 | | |
| CN | 107729856 A | 2/2018 | | |
| CN | 110009682 A | 7/2019 | | |
| CN | 110063694 A | * 7/2019 | .......... A47L 11/4011 | |
| CN | 110136186 A | 8/2019 | | |
| CN | 110231832 A | 9/2019 | | |
| CN | 110232707 A | 9/2019 | | |
| CN | 110297232 A | 10/2019 | | |
| CN | 111210468 A | 5/2020 | | |
| CN | 111382591 A | 7/2020 | | |
| CN | 111990930 A | 11/2020 | | |
| JP | 2012-159470 A | 8/2012 | | |
| JP | 2013-186293 A | 9/2013 | | |
| JP | 2019-106026 A | 6/2019 | | |

OTHER PUBLICATIONS

Notice of Allowance dated Feb. 18, 2022, issued in corresponding Chinese Patent Application No. 202010887031.9.

International Search Report issued in corresponding International Patent Application No. PCT/CN2021/085877 dated Jun. 30, 2021.

\* cited by examiner

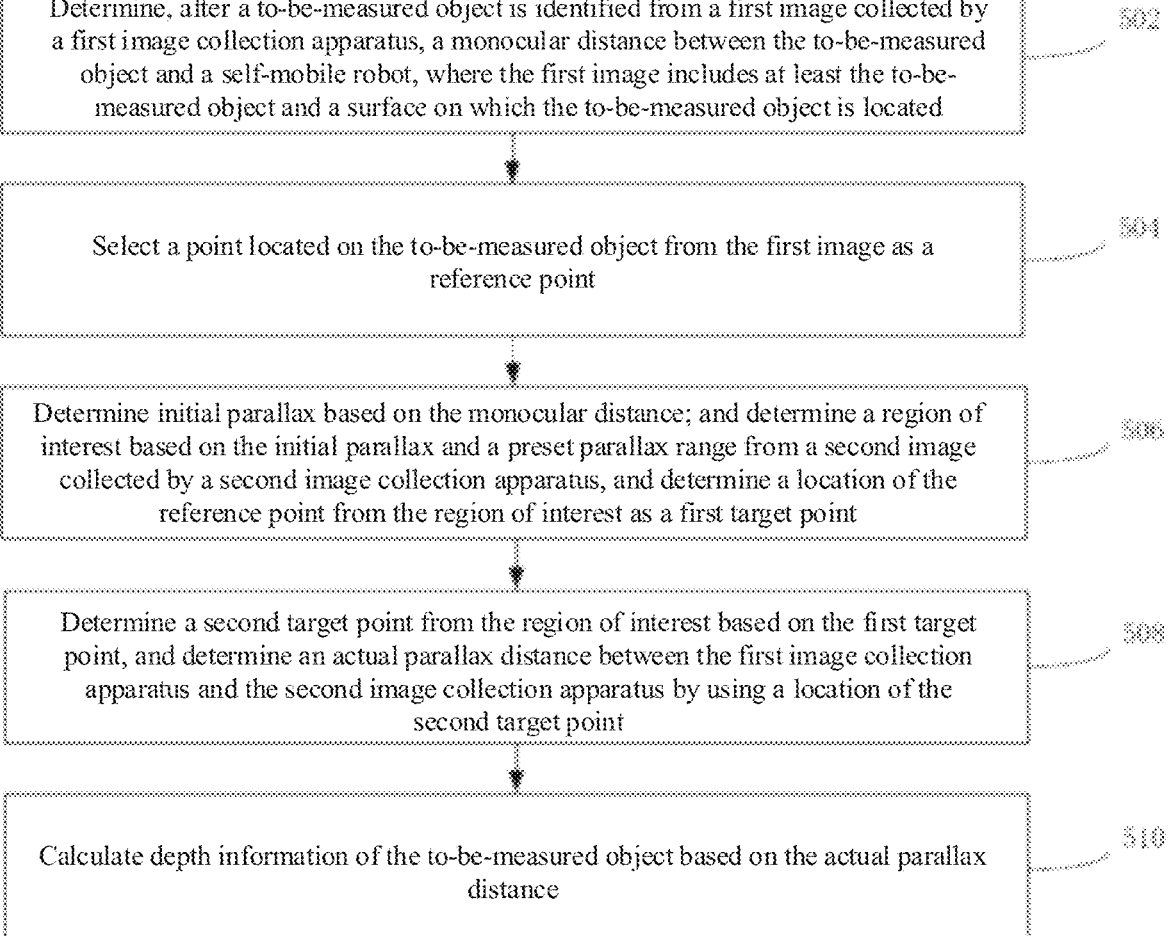

Determine, after a to-be-measured object is identified from a first image collected by a first image collection apparatus, a monocular distance between the to-be-measured object and a self-mobile robot, where the first image includes at least the to-be-measured object and a surface on which the to-be-measured object is located Select a point located on the to-be-measured object from the first image as a reference point Determine initial parallax based on the monocular distance; and determine a region of interest based on the initial parallax and a preset parallax range from a second image collected by a second image collection apparatus, and determine a location of the reference point from the region of interest as a first target point Determine a second target point from the region of interest based on the first target point, and determine an actual parallax distance between the first image collection apparatus and the second image collection apparatus by using a location of the second target point Calculate depth information of the to-be-measured object based on the actual parallax distance

FIG. 5

RANGING METHOD AND APPARATUS, ROBOT, AND STORAGE MEDIUM

CROSS-REFERENCE TO RELATED APPLICATIONS

This application claims priority to Chinese Patent Application No. 202010887031.9, filed on Aug. 28, 2020, which is incorporated into a part of this application by reference in its entirety.

TECHNICAL FIELD

The present disclosure relates to the field of sweeping robot ranging technologies, and in particular, to a ranging method, an apparatus, a robot, and a storage medium.

BACKGROUND

With the development of artificial intelligence technologies, various intelligent robots appear, such as sweep robots, mopping robots, vacuum cleaners, and weeders. These cleaning robots are capable of automatically identifying obstacles around them and performing obstacle avoidance operations during operation. These cleaning robots not only liberate the labor force and save manpower costs, but also improve cleaning efficiency.

In the process of identifying obstacles, existing cleaning robots usually continuously scan the surrounding region by using laser radars, determine whether an obstacle exists by using a reflected signal, and perform an obstacle avoidance operation when an obstacle exists. However, the laser radars are high in cost and large in volume and, therefore, have many defects for miniaturized sweeping robots. Some sweeping robots also use cameras to identify obstacles. However, algorithms are complex and the calculation accuracy is low.

SUMMARY

In view of this, embodiments of the present disclosure provide a ranging method, an apparatus, a robot, and a storage medium, so that a robot can accurately calculate a target distance of an obstacle.

An embodiment of the present disclosure provides a ranging method applied to a self-mobile robot configured with a first image collection apparatus and a second image collection apparatus, including: determining, after a to-be-measured object is identified from a first image collected by the first image collection apparatus, a first distance of the to-be-measured object relative to the self-mobile robot, where the first image includes at least the to-be-measured object and a surface on which the to-be-measured object is located; selecting a point located on the to-be-measured object from the first image as a reference point; determining initial parallax based on the first distance; and determining a region of interest based on the initial parallax and a preset parallax range from a second image collected by the second image collection apparatus, and determining a location of the reference point from the region of interest as a first target point; determining a second target point from the region of interest based on the first target point; determining an actual parallax distance between the first image collection apparatus and the second image collection apparatus by using a location of the second target point; and calculating depth information of the to-be-measured object based on the actual parallax distance.

Optionally, a collection time difference between the first image and the second image does not exceed a preset value.

Optionally, determining a second target point from the region of interest based on the first target point specifically includes: determining, as the second target point, a point matching an image of the first target point from the region of interest based on the first target point. Optionally, determining a first distance of the to-be-measured object relative to the self-mobile robot by using a first image collected by the first image collection apparatus, where the first image includes at least the to-be-measured object and a surface on which the to-be-measured object is located includes: obtaining the first image of the to-be-measured object by using the first image collection apparatus, where the first image includes at least an image of the to-be-measured object and a ground image from the first image collection apparatus to the to-be-measured object; determining an object region of the to-be-measured object from the first image, where the object region is the smallest rectangle, including the to-be-measured object; and determining the first distance of the to-be-measured object based on a lower edge location of the object region and a lower edge location of the first image, where the first distance is a distance between the first image collection apparatus and the to-be-measured object that is determined based on the first image collection apparatus.

Optionally, determining the first distance of the to-be-measured object based on a lower edge location of the object region and a lower edge location of the first image includes: determining a reference location from the first image as a coordinate origin; selecting any point from a lower side of the smallest rectangle as a first reference point, and determining a second reference point on a lower edge of the image based on the first reference point; and calculating the first distance of the to-be-measured object based on location coordinates of the first reference point and the second reference point.

Optionally, the calculating depth information of the to-be-measured object based on the actual parallax distance includes: determining a baseline distance between the first image collection apparatus and the second image collection apparatus, and calculating the depth information of the to-be-measured object based on the baseline distance, the actual parallax distance, and a focal length, where the depth information of the to-be-measured object meets the following relationship: $D=f*b/(b-d)$, where f is the focal length, b is the baseline distance, d is the actual parallax distance, and D is the depth information.

Optionally, when an optical axis elevation angle of the first image collection apparatus is $\theta$, a distance between the to-be-measured object and a front edge of the self-mobile robot meets the following relationship: $Z=D*\cos\theta-s$, where $\theta$ is the optical axis elevation angle, s is a distance between the first image collection apparatus and the front edge of the self-mobile robot, D is the depth information, and Z is the distance between the to-be-measured object and the front edge of the self-mobile robot.

Optionally, obtaining a first image of the to-be-measured object by using the first image collection apparatus includes: obtaining a field-of-view image by using the first image collection apparatus; and performing quality detection on the field-of-view image, and deleting a frame without the to-be-measured object to obtain an image that includes the to-be-measured object.

Optionally, performing quality detection on the field-of-view image and deleting a frame without the to-be-measured object to obtain an image that includes the to-be-measured object includes: performing edge filtering on the field-ofview image in a y direction and projecting a filtered image in an x direction; selecting a maximum value of a projected one-dimensional image signal; and when the maximum value is less than a preset threshold, determining that the field-of-view image is a frame without the to-be-measured object, and deleting the frame without the to-be-measured object; or when the maximum value is greater than or equal to a preset threshold, determining that the field-of-view image is a frame with the to-be-measured object, and retaining the frame with the to-be-measured object.

An embodiment of the present disclosure provides a ranging apparatus, applied to a self-mobile robot configured with a first image collection apparatus and a second image collection apparatus, including: a collection unit configured to determine, after a to-be-measured object is identified from a first image collected by the first image collection apparatus, a first distance of the to-be-measured object relative to the self-mobile robot, where the first image includes at least the to-be-measured object and a surface on which the to-be-measured object is located; a selection unit, configured to select a point located on the to-be-measured object from the first image as a reference point; a first determining unit configured to determine initial parallax based on the first distance; and determine a region of interest based on the initial parallax and a preset parallax range from a second image collected by the second image collection apparatus, and determine a location of the reference point from the region of interest as a first target point; a second determining unit, configured to determine a second target point from the region of interest based on the first target point; and determine an actual parallax distance between the first image collection apparatus and the second image collection apparatus by using a location of the second target point; and a calculation unit, configured to calculate depth information of the to-be-measured object based on the actual parallax distance.

Optionally, the collection unit is further configured to obtain the first image of the to-be-measured object by using the first image collection apparatus, where the first image includes at least an image of the to-be-measured object and a ground image from the first image collection apparatus to the to-be-measured object; and determine an object region of the to-be-measured object from the first image, where the object region is the smallest rectangle including the to-be-measured object; and determine the first distance of the to-be-measured object based on a lower edge location of the object region and a lower edge location of the first image, where the first distance is a distance between the first image collection apparatus and the to-be-measured object that is determined based on the first image collection apparatus.

Optionally, the collection unit is further configured to determine a reference location from the first image as a coordinate origin; select any point from a lower side of the smallest rectangle as a first reference point, and determine a second reference point on a lower edge of the image based on the first reference point; and calculate the first distance of the to-be-measured object based on location coordinates of the first reference point and the second reference point.

An embodiment of the present disclosure provides a robot, including a processor and a memory. The memory stores computer program instructions that can be executed by the processor, and when executing the computer program instructions, the processor implements the steps of any one of the methods described above.

An embodiment of the present disclosure provides a non-transitory computer-readable storage medium, storing computer program instructions. When the computer program instructions are invoked and executed by a processor, the steps of any one of the methods described above are implemented.

Compared with the prior art, the present invention has at least the following technical effects:

The embodiments of the present disclosure provide a ranging method, an apparatus, a robot, and a storage medium. In the ranging method, a target image and a ground image are obtained by using a characteristic that a camera of a sweeping robot is close to the ground, a depth distance of a target object under a first image collection apparatus may be obtained by analyzing characteristics of the images, and then a binocular target location is accurately obtained with reference to a binocular ranging calculation method, to correct a monocular depth distance of the object and finally obtain a more accurate object distance.

BRIEF DESCRIPTION OF DRAWINGS

To describe the technical solutions in the embodiments of the present disclosure or the prior art more clearly, the following briefly describes the accompanying drawings required for describing the embodiments or the prior art. Clearly, the accompanying drawings in the following description show some embodiments of the present disclosure, and persons of ordinary skill in the art may still derive other drawings from these accompanying drawings without creative efforts.

FIG. 5 is a schematic flowchart of a ranging method of a sweeping robot according to an embodiment of the present disclosure;

DESCRIPTION OF EMBODIMENTS

To make the objective, technical solutions and advantages of the present disclosure clearer, the following clearly and completely describes the technical solutions in the embodiments of the present disclosure with reference to the accompanying drawings in the implementations of the present disclosure. Clearly, the described embodiments are merely some rather than all of the embodiments of the present disclosure. All other embodiments obtained by persons of ordinary skill in the art based on the embodiments of the present disclosure without creative efforts shall fall within the protection scope of the present disclosure.

It should be understood that although terms "first," "second," "third," etc. can be used in one or more embodiments of the present disclosure to describe . . . , . . . is not limited to these terms. These terms are only used to differentiate between . . . . For example, without departing from the scope of the embodiments of the present disclosure, first . . . can also be referred to as second . . . , and similarly, second . . . can be referred to as first . . . .

Figure 1:
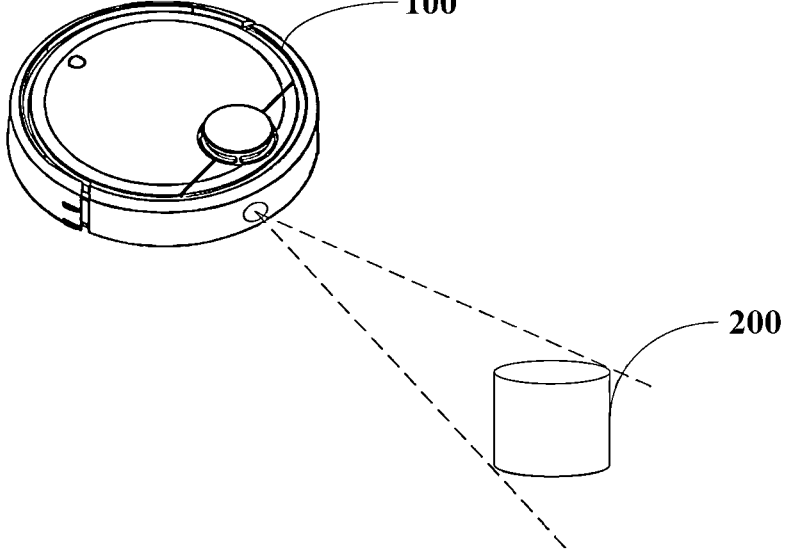
FIG. 1 is a schematic diagram of an application scenario according to an embodiment of the present disclosure.

This embodiment of the present disclosure provides a possible application scenario. The application scenario includes an automatic cleaning device 100, such as a sweeping robot, a mopping robot, a vacuum cleaner, or a weeder. In this embodiment, as shown in FIG. 1, taking a household sweeping robot as an example for description, during operation, the sweeping robot obtains a front field-of-view image in real time by using a camera in the front of the sweeping robot and performs an obstacle avoidance operation or another operation based on analysis of the field-of-view image. For example, the sweeping robot identifies obstacles such as an obstacle 200, determines types of the obstacles through search and comparison based on a storage database, and executes different solutions based on different types. In this embodiment, the robot may be disposed with a touch-sensitive display or controlled by a mobile terminal, to receive an operation instruction entered by a user. The sweeping robot may be disposed with various sensors such as a buffer, a cliff sensor, an ultrasonic sensor, an infrared sensor, a magnetometer, an accelerometer, a gyroscope (Gyro), and an odograph (ODO), and may be further disposed with wireless communications modules such as a Wi-Fi module and a Bluetooth module, to connect to an intelligent terminal or a server and receive, by using the wireless communications module, an operation instruction transmitted by the intelligent terminal or the server.

Figure 2:
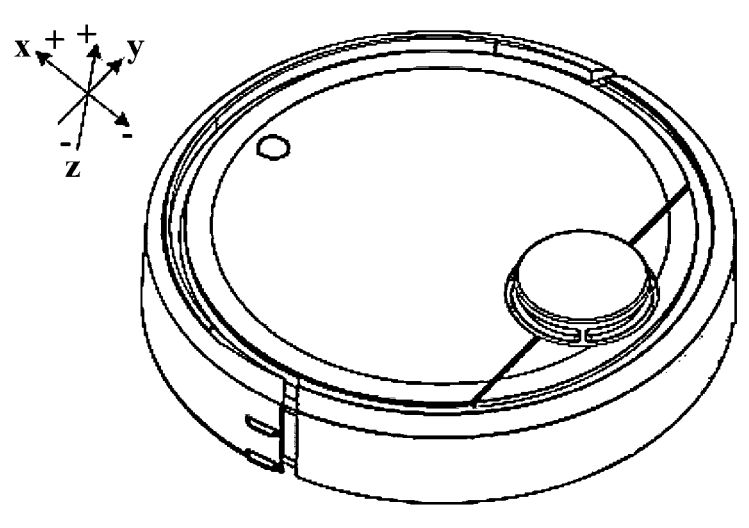
FIG. 2 is a three-dimensional structural diagram of a sweeping robot according to an embodiment of the present disclosure.

As shown in FIG. 2, the automatic cleaning device 100 may travel on the ground through various combinations of movement relative to the following three mutually perpendicular axes defined by a body 110: a longitudinal axis X, a lateral axis Y, and a central vertical axis Z. A forward drive direction along the longitudinal axis X is marked as "forward," and a backward drive direction along the longitudinal axis X is marked as "backward." The direction of the lateral axis Y is essentially a direction that extends between the right wheel and the left wheel of the robot along the axis center defined by the center point of a driving wheel module 141.

The automatic cleaning device 100 can rotate around the Y-axis. The direction is "upward" when the front part of the automatic cleaning device 100 is tilted upward and the rear part is tilted downward, and the direction is "downward" when the front part of the automatic cleaning device 100 is tilted downward and the rear part is tilted upward. In addition, the robot 100 can rotate around the Z-axis. In the forward direction of the automatic cleaning device 100, the direction is "rightward" when the automatic cleaning device 100 is tilted to the right side of the X-axis, and the direction is "leftward" when the automatic cleaning device 100 is tilted to the left side of the X-axis.

Figure 3:
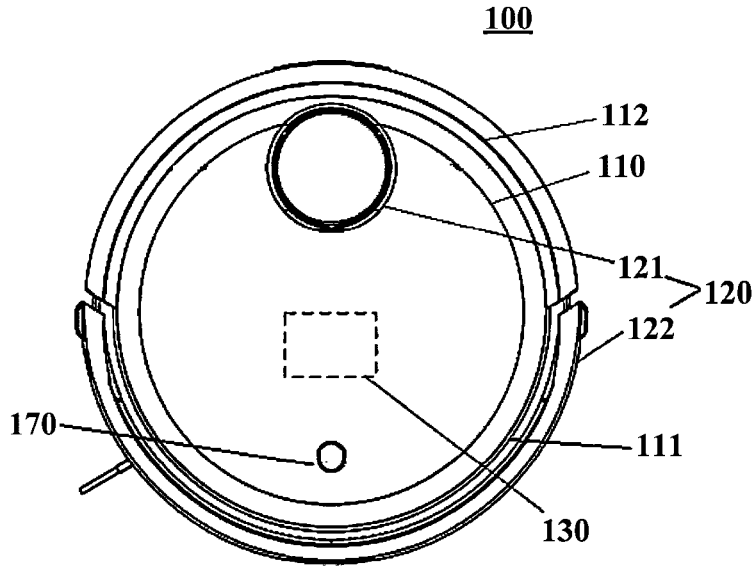
FIG. 3 is a top view of a structure of a sweeping robot according to an embodiment of the present disclosure.

As shown in FIG. 3, the automatic cleaning device 100 includes the machine body 110, a sensing system 120, a control system, a driving system 140, a cleaning system, an energy system, and a human-computer interaction system 180.

The machine body 110 includes a front part 111 and a rear part 112 and is approximately circle-shaped (both the front part and the rear part are circles). The machine body 110 may be in another shape, including, but not limited to, a front-square and rear-circle shape approximate to D and a front-square and rear-square rectangle or square.

As shown in FIG. 3, the sensing system 120 includes a location determining apparatus 121 on the machine body 110, a collision sensor and a proximity sensor that are disposed on a buffer 122 of the front part 111 of the machine body 110, a cliff sensor disposed on a lower part of the machine body, and sensing apparatuses such as a magnetometer, an accelerometer, a Gyro, and an ODO that are disposed inside the machine body, and is configured to provide various location information and motion status information of the machine to the control system 130. The location determining apparatus 121 includes, but is not limited to, a camera and a laser ranging apparatus (such as LDS, Laser Distance Sensor).

As shown in FIG. 3, the front part 111 of the machine body 110 may include the buffer 122. When the driving wheel module 141 drives the robot to walk on the ground during cleaning, the buffer 122 detects one or more events in a walking route of the automatic cleaning device 100 by using a sensor system such as an infrared sensor disposed on the buffer 122. Based on the events detected by the buffer 122, such as obstacles and walls, the automatic cleaning device 100 may control the driving wheel module 141 to enable the automatic cleaning device 100 to respond to the events (for example, keep away from the obstacles).

The control system 130 is disposed on a circuit board in the machine body 110 and includes a computing processor (for example, a central processing unit or an application processor, that communicates with a non-transitory memory such as a hard disk, a flash memory, or a random-access memory). The application processor draws, by using a positioning algorithm such as simultaneous localization and mapping (SLAM), a simultaneous map in an environment where a robot is located based on obstacle information that is fed back by the laser ranging apparatus. In addition, with reference to distance information and velocity information that is fed back by sensing apparatuses such as the sensor disposed on the buffer 122, the cliff sensor, the magnetometer, the accelerometer, the Gyro, and the ODO, the control system 130 comprehensively determines a current operating status and location of the sweeping machine and a current pose of the sweeping machine (for example, crossing a door sill, walking on a carpet, reaching a cliff, being stuck for the upper part or lower part, having a full dust box, or being picked up). The control system 130 further provides a specific next action policy based on different situations, so that the robot better meets a user's requirements and presents a better user experience.

Figure 4:
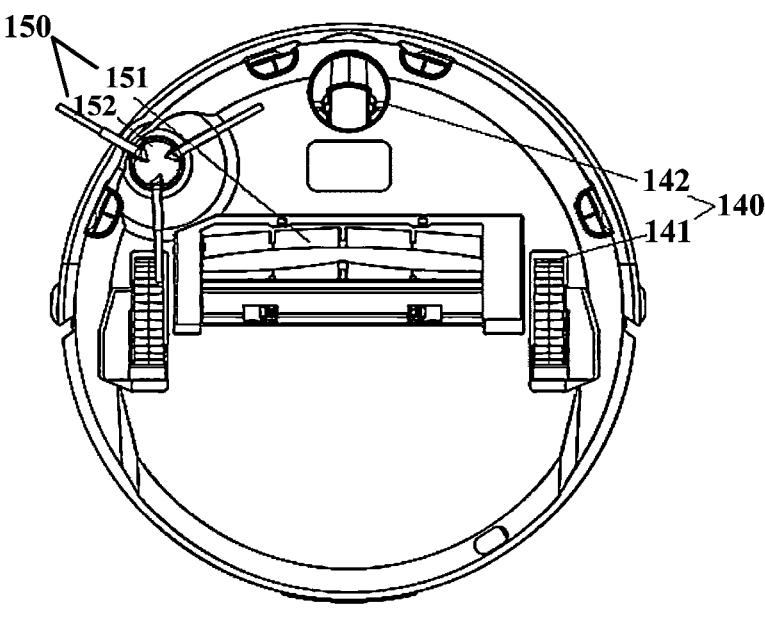
FIG. 4 is a bottom view of a structure of a sweeping robot according to an embodiment of the present disclosure.

As shown in FIG. 4, the driving system 140 may control, based on a driving command including distance and angle information (for example, components x, y, and θ), the robot 100 to move across the ground. The driving system 140 includes the driving wheel module 141. The driving wheel module 141 may control both a left wheel and a right wheel. To more accurately control movement of the machine, the driving wheel module 141 preferably includes a left driving wheel module and a right driving wheel module. The left and right driving wheel modules are opposed along a lateral axis defined by the body 110. To move more stably on the ground or have a stronger motion capability, the robot may include one or more driven wheels 142, and the driven wheels include but are not limited to universal wheels. The driving wheel module includes a walking wheel, a driving motor, and a control circuit for controlling the driving motor. The driving wheel module may be further connected to a circuit for measuring a driving current and the ODO. The driving wheel module 141 may be detachably connected to the body 110 for ease of disassembly and repair. The driving wheel may have an offset drop suspension system, which is secured in a movable manner (for example, attached in a rotatable manner to the robot body 110, and receives a spring offset that is offset downward and away from the robot body 110). The spring offset allows the driving wheel to maintain contact and traction with the ground with a certain force, and the cleaning element of the automatic cleaning device 100 is also in contact with the ground with certain pressure.

The cleaning system may be a dry cleaning system and/or a wet cleaning system. The dry cleaning system mainly functions by using a cleaning system 151, including a roller brush, a dust box, a fan, an air outlet, and connection parts between the four parts. The roller brush that has friction against the ground sweeps the rubbish on the ground and rolls it in front of a dust outlet between the roller brush and the dust box, and then the rubbish is sucked into the dust box by the suction gas generated by the fan and passing through the dust box. The dry cleaning system may further include a side brush 152 having a rotation shaft that is angled relative to the ground to move debris into the region of the roller brush of the cleaning system.

The energy system includes a charging battery such as a NiMH battery or a lithium battery. The charging battery may be connected to a charging control circuit, a battery pack charging temperature detection circuit, and a battery undervoltage monitoring circuit. The charging control circuit, the battery pack charging temperature detection circuit, and the battery undervoltage monitoring circuit are connected to a single-chip microcomputer control circuit. The host is charged by connecting a charging electrode disposed on a side or a lower part of the machine body to a charging pile. If dust is attached to the bare charging electrode, due to a charge accumulation effect during charging, a plastic body around the electrode is melted and deformed, and even the electrode is deformed, and the charging cannot continue normally.

The human-computer interaction system 180 includes buttons on a panel of the host, which are used by the user to select functions; may further include a display screen and/or an indicator and/or a horn, which display or displays the current status of the machine or function options to the user; and may further include a mobile phone client program. For an automatic cleaning device navigated based on a route, a mobile phone client may display a map of an environment where the device is located and a location of the machine to the user, to provide richer and more personalized function options to the user.

An embodiment of the present disclosure provides a ranging method, to obtain a target image and a ground image by using a characteristic that a camera of a sweeping robot is located on the ground, obtain a depth distance of a target object under a first image collection apparatus by analyzing characteristics of the images, and then accurately obtain a binocular target location with reference to a binocular ranging calculation method, to correct a monocular depth distance of the object and, finally, obtain a more accurate object distance.

As shown in FIG. 5, a ranging method is provided. The method is applied to a self-mobile robot configured with a first image collection apparatus and a second image collection apparatus, and specifically includes the following method steps.

Step S502: Determine, after a to-be-measured object is identified from a first image collected by the first image collection apparatus, a first distance of the to-be-measured object relative to the self-mobile robot (which may be referred to as a monocular distance), where the first image includes at least the to-be-measured object and a surface on which the to-be-measured object is located.

The first image collection apparatus is shown in FIG. 1, and the first image collection apparatus (for example, a camera) is disposed in the front of the sweeping robot, and is configured to obtain a front field-of-view image in a walking process of the sweeping robot in real time. The first image collection apparatus sends the front field-of-view image to a control system, and the control system provides an analysis result of the field-of-view image based on an operation result of the sweeping robot or a remote operation result, to control a driving system to perform obstacle avoidance or another operation.

The to-be-measured object is any obstacle encountered in the walking process of the sweeping robot. The sweeping robot may pre-classify obstacles of related types and store the obstacles in a storage system of the sweeping robot or a remote storage system. When the sweeping robot obtains an obstacle image during operation, the sweeping robot may invoke the obstacle image pre-stored in the storage system to determine type information of the current obstacle, and perform a related operation based on the type information. Certainly, in the foregoing step, identifying a to-be-measured object may also be understood as detecting the presence of an obstacle in the walking process without identifying a type of the obstacle.

Figure 6:
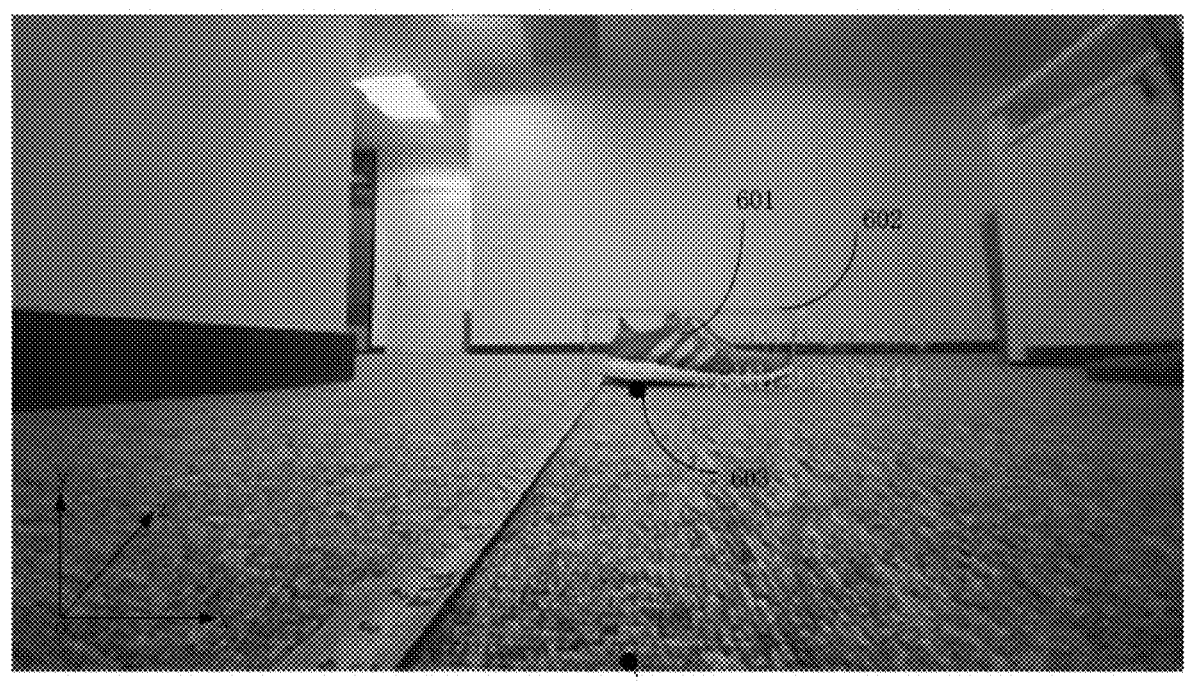
FIG. 6 is a schematic diagram of an image obtained by a sweeping robot according to an embodiment of the present disclosure.

As shown in FIG. 6, images obtained by using the first image collection apparatus in the front of the sweeping robot include an image of a to-be-measured object 601 on the ground, and another scene image in a field of view in front of the first image collection apparatus. Because the first image collection apparatus is located in the front of the sweeping robot and is located at a relatively low height, the field-of-view image includes a ground image from the first image collection apparatus to the to-be-measured object (for example, the location indicated by a ruler in FIG. 6). The ground image is used to calculate a depth distance between the to-be-measured object 601 and the first image collection apparatus (for example, a camera).

Determining a first distance of the to-be-measured object relative to the self-mobile robot includes: determining the first distance of the to-be-measured object based on a lower edge location of the object region and a lower edge location of the first image. For example, as shown in FIG. 6, the to-be-measured object 601 on the ground is obtained by using the first image collection apparatus in the front of the sweeping robot, and a corresponding smallest rectangle 602 is constructed based on the to-be-measured object 601. The smallest rectangle 602 exactly envelops the to-be-measured object 601. Selecting the smallest rectangle as a circumscribed region can make it convenient to select any point on the lower edge to calculate the first distance.

An object region of the to-be-measured object is determined from the first image in the foregoing manner. For example, the object region is the smallest rectangle including the to-be-measured object. Certainly, the object region may be a figure other than the smallest rectangle (for example, a circumscribed circle, an ellipse, or any specific shape, or the object region may be a lower edge line of contact between the to-be-measured object and the ground).

Figure 7:
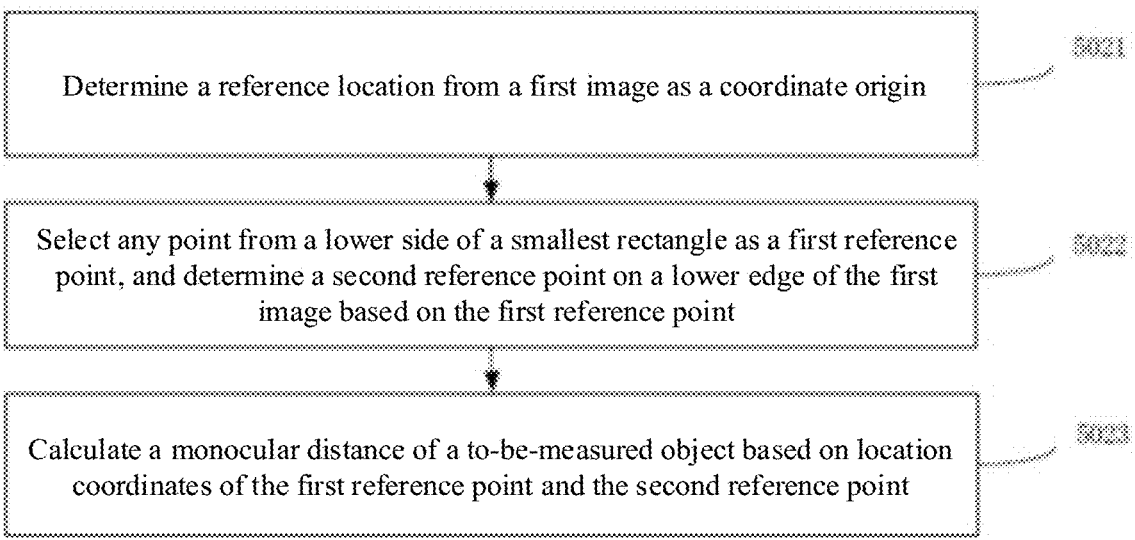
FIG. 7 is a schematic flowchart of a monocular ranging method of a sweeping robot according to an embodiment of the present disclosure.

In an optional implementation, determining the first distance of the to-be-measured object based on a lower edge location of the object region and a lower edge location of the first image includes the following substeps, as shown in FIG. 7.

Step S5021: Determine a reference location from the first image as a coordinate origin.

As shown in FIG. 6, a lower left corner of the first image may be selected as the coordinate origin, a horizontal direction is an x direction, a vertical direction is a y direction, and a direction perpendicular to the image is a z direction. Certainly, a selection location of the coordinate origin of the image is not unique and may be randomly selected based on a data analysis need.

Step S5022: In an implementation, select any point from a lower side of the smallest rectangle as a first reference point 603 and determine a second reference point 604 on a lower edge of the first image based on the first reference point.

Selecting the first reference point 603 is selecting any point from the lower side of the smallest rectangle. If the object region is a circle, the lowest point is selected as the first reference point. The second reference point 604 is a point of intersection with the lower edge of the first image after the first reference point 603 extends downward vertically, that is, the bottom-most point of the first image that represents the ground in the image. In this way, a distance from the to-be-measured object to the camera may be calculated from a location relationship between the first reference point 603 and the second reference point 604, that is, a distance from the to-be-measured object to the camera may be obtained by using a ground distance.

Step S5023: Calculate the first distance of the to-be-measured object based on location coordinates of the first reference point and the second reference point.

For example, if coordinates of the first reference point 603 are (x1, y1) and coordinates of the second reference point 604 are (x2, y2), a distance between the first reference point 603 and the second reference point 604 may be calculated. For another example, a pixel location of the first reference point 603 and a pixel location of the second reference point 604 are obtained by analyzing a pixel relationship, so that a pixel distance between the first reference point 603 and the second reference point 604 is estimated, and then an actual distance between the first reference point 603 and the second reference point 604 is determined based on an actual height of the to-be-measured object and the pixel relationship.

In an optional implementation, a method for obtaining an image of the to-be-measured object by using the first image collection apparatus includes: obtaining a field-of-view image by using the first image collection apparatus, performing quality detection on the field-of-view image, and deleting a frame without the to-be-measured object, to obtain an image that includes the to-be-measured object. Specifically, for example, edge filtering is performed on the field-of-view image in a y direction, and a filtered image is projected in an x direction; a maximum value of a projected one-dimensional image signal is selected, where for example, if a one-dimensional distance in the x direction (for example, 80-100 pixels) is obtained based on location parameters after projection, the pixel value of 100 is selected; and when the maximum value is less than a preset threshold, it is determined that the field-of-view image is a frame without the to-be-measured object, and the frame without the to-be-measured object is deleted; or when the maximum value is greater than or equal to a preset threshold, it is determined that the field-of-view image is a frame with the to-be-measured object, and the frame with the to-be-measured object is retained. For example, the threshold is set to 50 pixels. When projected pixels are more than 50 pixels, the frame is considered as a valid frame; otherwise, the frame is an invalid frame. When it is determined that the frame is a valid frame, the subsequent step of determining the distance of the to-be-measured object is entered; otherwise, the corresponding image is deleted.

Figure 8:
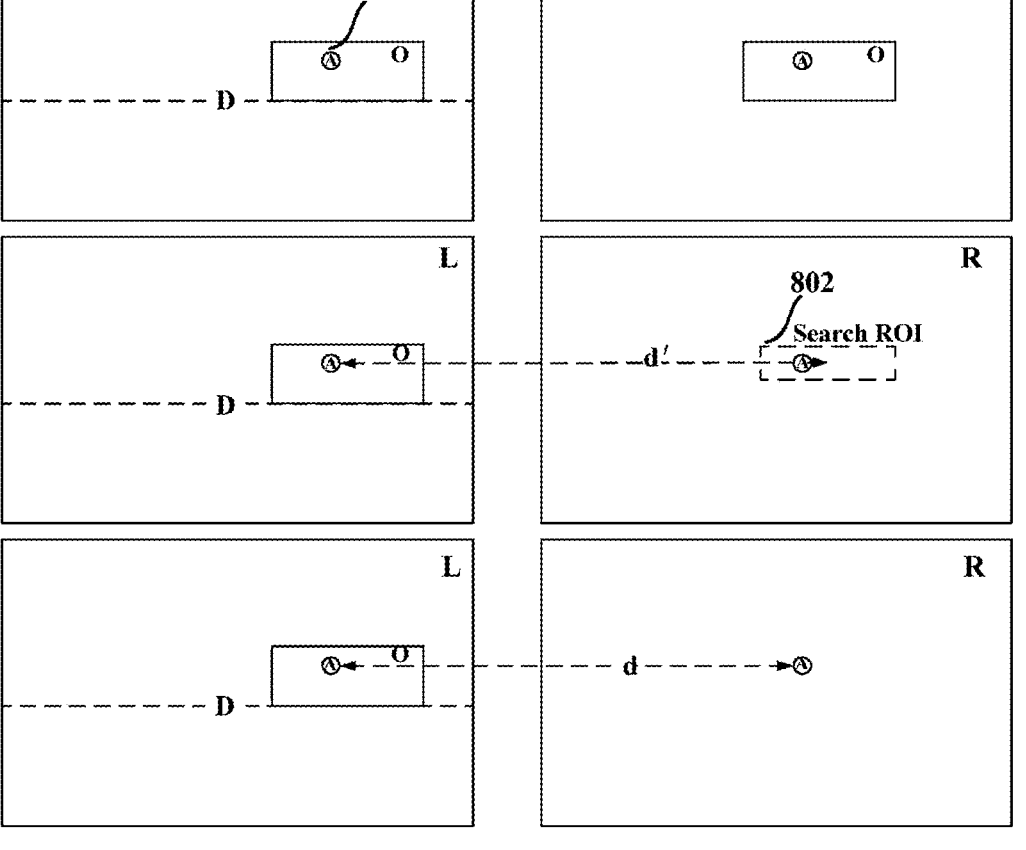
FIG. 8 is a schematic diagram of region search in a binocular ranging method of a sweeping robot according to an embodiment of the present disclosure.

Step S504: Select a point located on the to-be-measured object from the first image as a reference point. For example, as shown in FIG. 8, any point of the to-be-measured object is selected from the object region as a reference point 801. The reference point 801 is preferably a geometric center of the to-be-measured object or a location whose object feature is relatively easy to identify.

Step S506: Determine initial parallax based on the first distance; and determine a region of interest based on the initial parallax and a preset parallax range from a second image collected by the second image collection apparatus (for example, a camera), and determine a location of the reference point from the region of interest as a first target point.

The initial parallax is parallax determined based on a geometric relationship of binocular ranging or the like after the first distance is determined. Specifically, the initial parallax may be calculated based on the first distance by using the following formula: $D=f*b/(b-d)$, where f is a focal length of the first image collection apparatus, b is a baseline distance, d is a parallax distance, and D is the first distance.

The region of interest is determined based on the calculated initial parallax and the preset parallax range from the second image collected by the second image collection apparatus (for example, a camera). The preset parallax range is a redundant value range that is set to avoid inaccuracy of the initial parallax that may be caused by the uncertainty of calculation precision, to accurately find a corresponding target point. The region of interest is determined based on the object region determined from the first image, the initial parallax, and the preset parallax range, that is, the second image is searched for the region of the first target point corresponding to the reference point.

In an optional implementation, a collection time difference between the first image and the second image does not exceed a preset value. As a constraint, the time difference between obtaining the first image by the first image obtaining apparatus and obtaining the second image by the second image obtaining apparatus does not exceed the preset value (for example, 100 ms or a shorter millisecond-level time range). In this way, the consistency between the two images can be ensured optimally to avoid corresponding point search failure caused by object motion or another reason.

Step S508: Determine a second target point from the region of interest based on the first target point, and determine an actual parallax distance between the first image collection apparatus and the second image collection apparatus by using a location of the second target point. Specifically, the second target point is a point matching an image of the first target point in the region of interest.

As shown in FIG. 8, any point of the to-be-measured object is selected from the object region as a reference point 801; a search region 802 of the reference point 801 based on binocular measurement is determined based on the first distance, the initial parallax distance d', and the preset parallax range; and the search region 802 is searched for a first target point A corresponding to the reference point 801 in the search region. Because the estimated parallax range is inaccurate, the first target point A may not be a target point actually corresponding to the reference point, and there may be a relatively small distance error. In this case, an accurate second target point may be determined by searching near the first target point A with the first target point as a center. The second target point is a target point accurately corresponding to the reference point, and the second target point may be determined through matching by using an image comparison method.

Step S510: Calculate depth information of the to-be-measured object based on the actual parallax distance.

Figure 9:
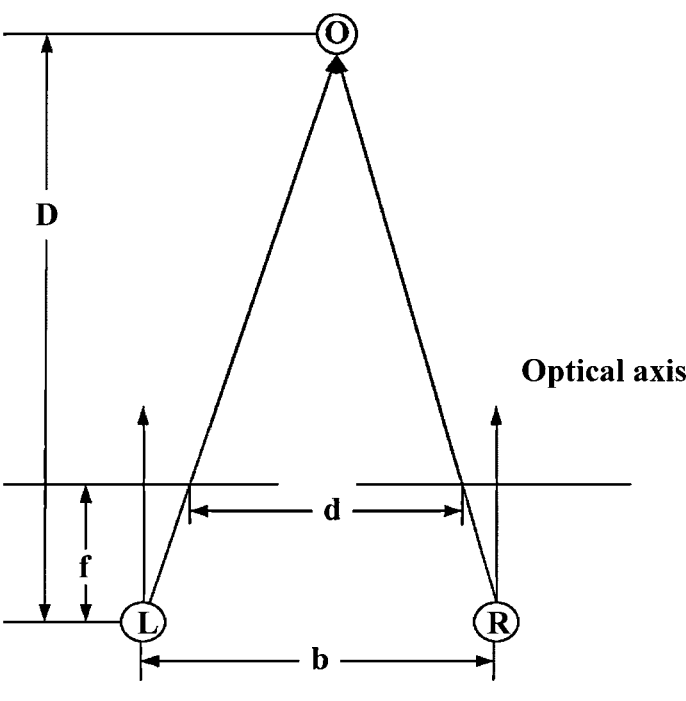
FIG. 9 is a schematic diagram of a geometric structure of a binocular ranging calculation method of a sweeping robot according to an embodiment of the present disclosure.

Optionally, as shown in FIG. 9, calculating a binocular distance D of the to-be-measured object during binocular measurement based on a geometric relationship of binocular measurement specifically includes: determining a baseline distance b between the first image obtaining apparatus and the second image obtaining apparatus during binocular measurement through measurement, etc.; and calculating the binocular distance of the to-be-measured object based on the baseline distance b, the actual parallax distance d, and a focal length f, where the binocular distance meets the following relationship: $D=f*b/(b-d)$, where f is the focal length, b is the baseline distance, d is the actual parallax distance, and D is the binocular distance.

Figure 10:
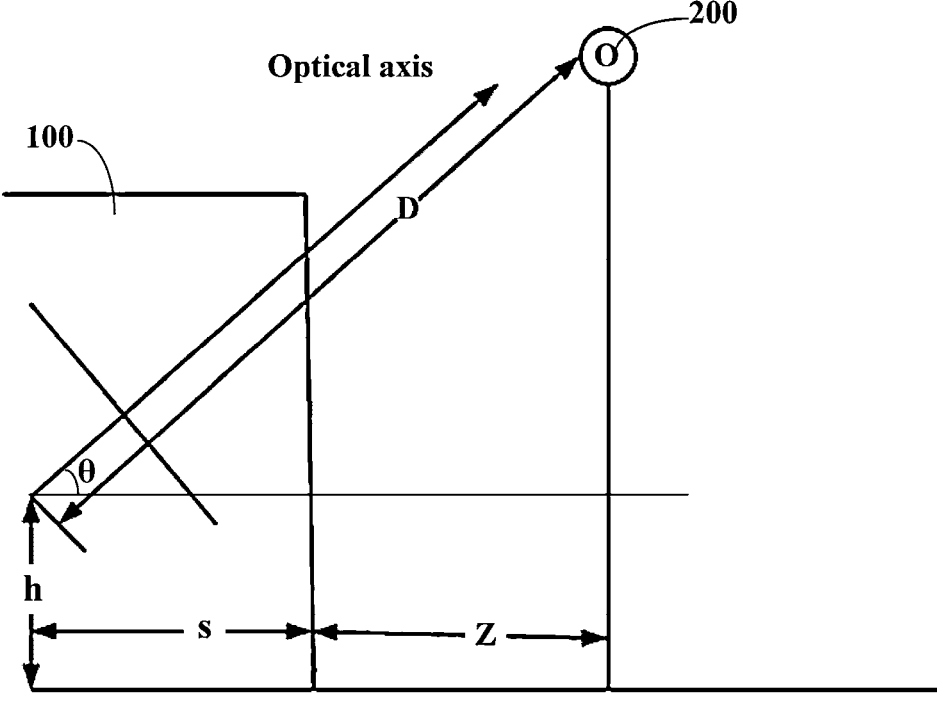
FIG. 10 is a schematic diagram of a geometric structure of a binocular ranging calculation method of a sweeping robot according to another embodiment of the present disclosure.

Optionally, in another implementation, as shown in FIG. 10, when an optical axis of the first image collection apparatus has an elevation angle, calculating a binocular distance D of the to-be-measured object during binocular measurement includes: when an optical axis elevation angle of the first image collection apparatus is $\theta$, a distance between the to-be-measured object and a front edge of the sweeping robot meets the following relationship: $Z=D*\cos\theta-s$, where $\theta$ is the optical axis elevation angle, s is a distance between the first image collection apparatus and the front edge of the sweeping robot, D is the binocular distance, and Z is the distance between the to-be-detected object and the front edge of the sweeping machine.

In this embodiment of the present disclosure, a target image and a ground image are obtained by using a characteristic that a camera of a sweeping robot is close to the ground, a depth distance of a target object under a first image collection apparatus may be obtained by analyzing characteristics of the images, and then a binocular target location is accurately obtained with reference to a binocular ranging calculation method, to correct a monocular depth distance of the object and finally obtain a more accurate object distance.

Figure 11:
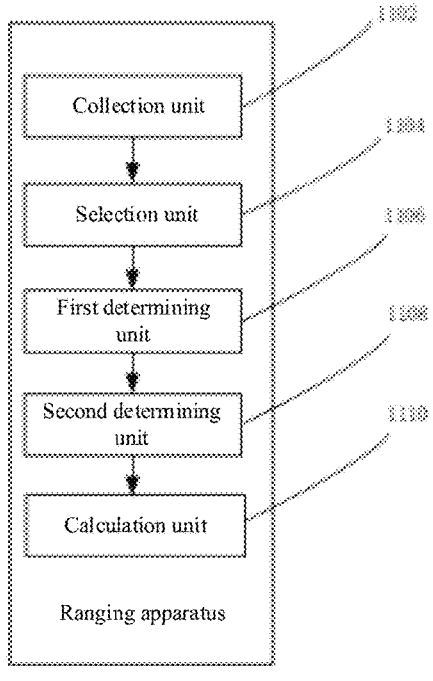
FIG. 11 is a schematic structural diagram of a ranging apparatus of a cleaning robot according to an embodiment of the present disclosure.

As shown in FIG. 11, an embodiment of the present disclosure provides a ranging apparatus applied to a self-mobile robot configured with a first image collection apparatus and a second image collection apparatus, including a collection unit 1102, a selection unit 1104, a first determining unit 1106, a second determining unit 1108, and a calculation unit 1110. The units perform the method steps described in the foregoing embodiment. The same method step has the same technical effect, and details are not described herein again. Specifically, the collection unit 1102 is configured to determine, after a to-be-measured object is identified from a first image collected by the first image collection apparatus, a first distance of the to-be-measured object relative to the self-mobile robot, where the first image includes at least the to-be-measured object and a surface on which the to-be-measured object is located.

In an optional implementation, the collection unit 1102 is further configured to obtain the first image of the to-be-measured object by using the first image collection apparatus, where the first image includes at least an image of the to-be-measured object and a ground image from the first image collection apparatus to the to-be-measured object; and determine an object region of the to-be-measured object from the first image, where the object region is the smallest rectangle including the to-be-measured object; and determine the first distance of the to-be-measured object based on a lower edge location of the object region and a lower edge location of the first image, where the first distance is a distance between the first image collection apparatus and the to-be-measured object that is determined based on the first image collection apparatus.

In an optional implementation, the collection unit 1102 is further configured to determine a reference location from the first image as a coordinate origin; select any point from a lower side of the smallest rectangle as a first reference point and determine a second reference point on a lower edge of the first image based on the first reference point; and calculate the first distance of the to-be-measured object based on location coordinates of the first reference point and the second reference point. In an optional implementation, the collection unit 1102 is further configured to obtain a field-of-view image by using the first image collection apparatus; and perform quality detection on the field-of-view image, and delete a frame without the to-be-measured object, to obtain an image that includes the to-be-measured object. Specifically, for example, edge filtering is performed on the field-of-view image in a y direction and a filtered image is projected in an x direction; a maximum value of a projected one-dimensional image signal is selected; and when the maximum value is less than a preset threshold, it is determined that the field-of-view image is a frame without the to-be-measured object, and the frame without the to-be-measured object is deleted; or when the maximum value is greater than or equal to a preset threshold, it is determined that the field-of-view image is a frame with the to-be-measured object, and the frame with the to-be-measured object is retained.

The selection unit 1104 is configured to select a point located on the to-be-measured object from the first image as a reference point. For example, as shown in FIG. 8, any point of the to-be-measured object is selected from the object region as a reference point 801. The reference point 801 is preferably a geometric center of the to-be-measured object or a location whose object feature is relatively easy to identify.

The first determining unit 1106 is configured to determine initial parallax based on the first distance; and determine a region of interest based on the initial parallax and a preset parallax range from a second image collected by the second image collection apparatus (for example, a camera), and determine a location of the reference point from the region of interest as a first target point, where a collection time difference between the first image and the second image does not exceed a preset value.

The second determining unit 1108 is configured to determine a second target point matching an image of the first target point from the region of interest based on the first target point, and determine an actual parallax distance between the first image collection apparatus and the second image collection apparatus by using a location of the second target point.

The calculation unit 1110 is configured to calculate depth information of the to-be-measured object based on the actual parallax distance.

Optionally, as shown in FIG. 9, calculating a binocular distance D of the to-be-measured object during binocular measurement based on a geometric relationship of binocular measurement specifically includes: determining a baseline distance b between the first image obtaining apparatus and the second image obtaining apparatus during binocular measurement through measurement, etc.; and calculating the binocular distance of the to-be-measured object based on the baseline distance b, the actual parallax distance d, and a focal length f, where the binocular distance meets the following relationship: $D=f*b/(b-d)$, where f is the focal length, b is the baseline distance, d is the actual parallax distance, and D is the binocular distance.

Optionally, in another implementation, as shown in FIG. 10, when an optical axis of the first image collection apparatus has an elevation angle, calculating a binocular distance D of the to-be-measured object during binocular measurement includes: when an optical axis elevation angle of the first image collection apparatus is $\theta$, a distance between the to-be-measured object and a front edge of the sweeping robot meets the following relationship: $Z=D*\cos\theta-s$, where $\theta$ is the optical axis elevation angle, s is a distance between the first image collection apparatus and the front edge of the sweeping robot, D is the binocular distance, and Z is the distance between the to-be-detected object and the front edge of the sweeping machine.

According to the ranging apparatus provided in this embodiment of the present disclosure, a target image and a ground image are obtained by using a characteristic that a camera of a sweeping robot is close to the ground, a depth distance of a target object under a first image collection apparatus may be obtained by analyzing characteristics of the images, and then a binocular target location is accurately obtained with reference to a binocular ranging calculation method, to correct a monocular depth distance of the object and, finally, obtain a more accurate object distance.

An embodiment of the present disclosure provides a non-transitory computer readable storage medium storing computer program instructions. When the computer program instructions are invoked and executed by a processor, the steps of any one of the methods described above are implemented.

An embodiment of the present disclosure provides a robot, including a processor and a memory. The memory stores computer program instructions that can be executed by the processor, and when executing the computer program instructions, the processor implements the steps of the method according to any one of the foregoing embodiments.

Figure 12:
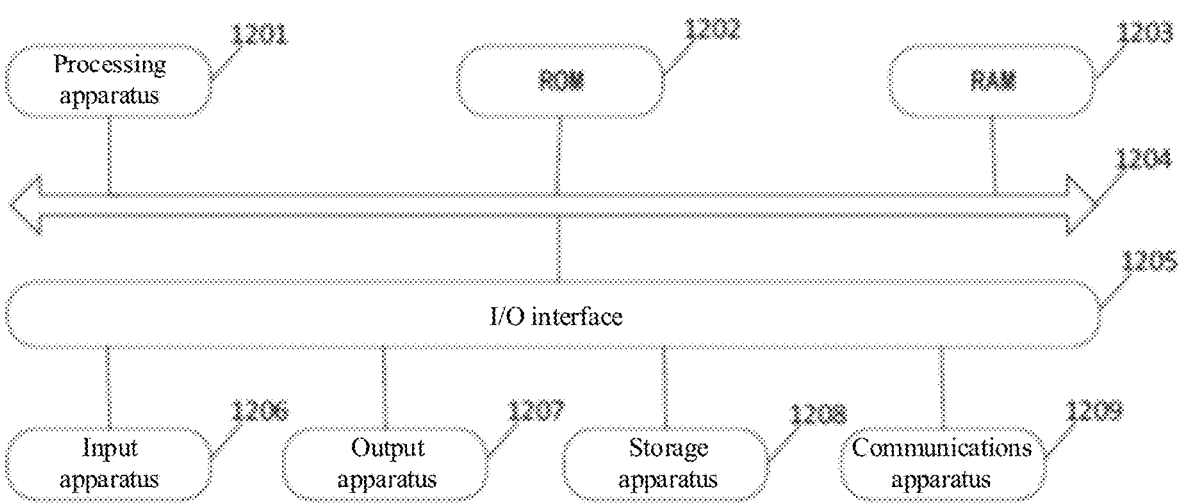
FIG. 12 is a schematic diagram of an electronic structure of a robot according to an embodiment of the present disclosure.

As shown in FIG. 12, the robot may include a processing apparatus (for example, a central processing unit or a graphics processing unit) 1201 that may perform various appropriate actions and processing based on programs stored in a read-only memory (ROM) 1202 or programs loaded from a storage apparatus 1208 into a random-access memory (RAM) 1203. The RAM 1203 further stores various programs and data required for operations of the electronic robot 1200. The processing apparatus 1201, the ROM 1202, and the RAM 1203 are connected to each other by using a bus 1204. An input/output (I/O) interface 1205 is also connected to the bus 1204.

Generally, the following apparatuses may be connected to the I/O interface 1205: an input apparatus 1206, including a touchscreen, a touchpad, a keyboard, a mouse, a camera, a microphone, an accelerometer, a gyroscope, etc.; an output apparatus 1207, including a liquid crystal display (LCD), a loudspeaker, a vibrator, etc.; the storage apparatus 1208, including a hard disk; and a communications apparatus 1209. The communications apparatus 1209 may allow the electronic robot to communicate wirelessly or wiredly with another robot to exchange data. Although FIG. 12 shows an electronic robot with various apparatuses, it should be understood that all shown apparatuses are not mandatory. Alternatively, there may be more or fewer apparatuses.

In particular, according to this embodiment of the present disclosure, the process described above with reference to the flowchart may be implemented as robot software programs. For example, this embodiment of the present disclosure includes a robot software program product including computer programs carried on a readable medium, and the computer programs include program code used to perform the method shown in the flowchart. In such an embodiment, the computer programs may be downloaded from a network and installed by using the communications apparatus 1209, installed from the storage apparatus 1208, or installed from the ROM 1202. When the computer programs are executed by the processing apparatus 1201, the foregoing functions defined in the method in the embodiments of the present disclosure are performed.

It should be noted that the foregoing computer readable medium in the present disclosure may be a computer-readable signal medium, a computer-readable storage medium, or any combination of the two. The computer-readable storage medium may be, but is not limited to, an electrical, magnetic, optical, electromagnetic, infrared, or semiconductor system, apparatus, or device, or any combination thereof. A more specific example of the computer-readable storage medium may include, but is not limited to, an electrical connection having one or more leads, a portable computer disk, a hard disk, a RAM, a ROM, an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal propagated in a baseband or as a part of a carrier, and carries computer readable program code. The propagated data signal may be in multiple forms, including, but not limited to, an electromagnetic signal, an optical signal, or any suitable combination thereof. The computer readable signal medium may be alternatively any computer readable medium other than a computer-readable storage medium, and the computer-readable signal medium may send, propagate, or transmit a program that is used by or in combination with an instruction execution system, apparatus, or device. The program code included in the computer-readable medium may be transmitted by using any suitable medium, including, but not limited to, a wire, an optical cable, a radio frequency (RF), or any suitable combination thereof.

The computer readable medium may be included in the foregoing robot or may exist separately and not be assembled into the robot.

Computer program code for performing the operations of the present disclosure may be written into one or more programming languages such as Java, Smalltalk, C++, and conventional programming languages such as the "C" language or similar programming languages. The program code may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet using an Internet service provider).

Flowcharts and block diagrams in the accompanying drawings illustrate possible system architectures, functions, and operations of systems, methods, and computer program products in accordance with various embodiments of the present disclosure. In this regard, each block in the flowcharts or block diagrams may represent one module, program segment, or part of code that includes one or more executable instructions for implementing specified logical functions. It should also be noted that in some alternative implementations, functions marked in the blocks may occur in a different order than those marked in the accompanying drawings. For example, two successive blocks may actually be executed substantially concurrently, and they may sometimes be executed in reverse order, depending on the functions involved. It should also be noted that each block in the block diagrams and/or flowcharts and a combination of blocks in the block diagrams and/or flowcharts may be implemented by using a dedicated hardware-based system that performs specified functions or operations, or may be implemented by using a combination of dedicated hardware and a computer instruction.

The foregoing apparatus embodiments are merely examples. The units described as separate parts can or cannot be physically separate, and parts displayed as units can or cannot be physical units, can be located in one position, or can be distributed on a plurality of network units. Some or all of the modules can be selected based on an actual need to implement the solutions of the embodiments. Persons of ordinary skill in the art can understand and implement the embodiments without creative efforts.

Finally, it should be noted that the foregoing embodiments are merely used to describe the technical solutions of the present disclosure but are not intended to limit the technical solutions. Although the present disclosure is described in detail with reference to the foregoing embodiments, persons of ordinary skill in the art should understand that they may make modifications to the technical solutions described in the foregoing embodiments, or perform equivalent replacement on some of the technical features. However, these modifications or replacements do not preclude the essence of the corresponding technical solutions from the spirit and scope of the technical solutions of the embodiments of the present disclosure.

What is claimed is:

1. A ranging method, applied to a self-mobile robot configured with a first image collection apparatus and a second image collection apparatus, comprising:
  determining, in response to identifying an object to be measured from a first image collected by the first image collection apparatus, a first distance of the object relative to the self-mobile robot, wherein content in the first image comprises at least the object and a surface on which the object is located;
  selecting a point located on the object from the first image as a reference point;
  determining initial parallax based on the first distance; and determining, based on the initial parallax and a preset parallax range, a region of interest from a second image collected by the second image collection apparatus, and determining a location of the reference point from the region of interest as a first target point;
  determining a second target point from the region of interest based on the first target point, and determining an actual parallax distance between the first image collection apparatus and the second image collection apparatus by using a location of the second target point; and
  calculating depth information of the object based on the actual parallax distance.

2. The method according to claim 1, wherein a collection time difference between the first image and the second image does not exceed a preset value.

3. The method according to claim 1, wherein the determining the second target point from the region of interest based on the first target point specifically comprises:
  determining, based on the first target point and from the region of interest, a point matching an image of the first target point, as the second target point.

4. The method according to claim 1, wherein the determining, after the object is identified from the first image collected by the first image collection apparatus, the first distance of the object relative to the self-mobile robot specifically comprises:
  obtaining the first image of the object, wherein the content in the first image further comprises a surface from the first image collection apparatus to the object;
  determining an object region of the object from the first image, wherein the object region is the smallest rectangle enclosing the object; and
  determining the first distance of the object based on a lower edge location of the object region and a lower edge location of the first image.

5. The method according to claim 4, wherein the determining the first distance of the object based on the lower edge location of the object region and the lower edge location of the first image comprises:
  determining a reference location from the first image as a coordinate origin;
  selecting any point from a lower side of the smallest rectangle as a first reference point, and determining a second reference point on a lower edge of the first image based on the first reference point; and
  calculating the first distance of the object based on location coordinates of the first reference point and the second reference point.

6. The method according to claim 5, wherein the calculating depth information of the object based on the actual parallax distance comprises:
  determining a baseline distance between the first image collection apparatus and the second image collection apparatus, and calculating the depth information of the object based on the baseline distance, the actual parallax distance, and a focal length, wherein the depth information of the object meets the following relationship:
  $D=f*b/(b-d)$, wherein f is the focal length, b is the baseline distance, d is the actual parallax distance, and D is the depth information.

7. The method according to claim 6, further comprising:
  calculating a distance between the object and a front edge of the self-mobile robot, wherein the distance between the object and a front edge of the self-mobile robot meets the following relationship:

$Z=D*\cos\theta-s$, wherein 0 is an optical axis elevation angle of the first image collection apparatus, s is a distance between the first image collection apparatus and the front edge of the self-mobile robot, D is the depth information, and Z is the distance between the object and the front edge of the self-mobile robot.

8. The method according to claim 4, wherein the obtaining the first image of the object by using the first image collection apparatus comprises:

obtaining a field-of-view image by using the first image collection apparatus; and obtaining the first image with the object by performing quality detection on the field-of-view image and deleting a frame without the object.

9. The method according to claim 8, wherein the obtaining the first image with the object by performing the quality detection on the field-of-view image and deleting the frame without the object comprises:

performing edge filtering on the field-of-view image in a first direction, and projecting a filtered image in a second direction perpendicular to the first direction;

selecting a maximum value of a projected one-dimensional image signal; and when the maximum value is less than a preset threshold, determining the field-of-view image as the frame without the object, and deleting the frame without object; or when the maximum value is greater than or equal to the preset threshold, determining the field-of-view image as a frame with the object, and retaining the frame with the object.

10. A robot, comprising a first image collection apparatus, a second image collection apparatus, a processor and a memory, wherein the memory stores computer program instructions capable of being executed by the processor, and when executing the computer program instructions, the processor is configured to:

determine, in response to identifying an object to be measured from a first image collected by the first image collection apparatus, a first distance of the object relative to the self-mobile robot, wherein content in the first image comprises at least the object and a surface on which the object is located;

select a point located on the object from the first image as a reference point;

determine initial parallax based on the first distance; and determine, based on the initial parallax and a preset parallax range, a region of interest from a second image collected by the second image collection apparatus, and determine a location of the reference point from the region of interest as a first target point;

determine a second target point from the region of interest based on the first target point, and determine an actual parallax distance between the first image collection apparatus and the second image collection apparatus by using a location of the second target point; and calculate depth information of the object based on the actual parallax distance.

11. A non-transitory computer-readable storage medium, storing computer program instructions, wherein when the computer program instructions are invoked and executed by a processor, a ranging method is implemented, wherein the ranging method comprises:

determining, in response to identifying an object to be measured from a first image collected by a first image collection apparatus, a first distance of the object relative to the self-mobile robot, wherein content in the first image comprises at least the object and a surface on which the object is located;

selecting a point located on the object from the first image as a reference point;

determining initial parallax based on the first distance; and determining, based on the initial parallax and a preset parallax range, a region of interest from a second image collected by a second image collection apparatus, and determining a location of the reference point from the region of interest as a first target point;

determining a second target point from the region of interest based on the first target point, and determining an actual parallax distance between the first image collection apparatus and the second image collection apparatus by using a location of the second target point; and calculating depth information of the object based on the actual parallax distance.

12. The robot according to claim 10, wherein the processor is specifically configured to:

determine, based on the first target point and from the region of interest, a point matching an image of the first target point, as the second target point.

13. The robot according to claim 10, wherein the processor is specifically configured to:

obtain the first image of the object, wherein the content in the first image further comprises a surface from the first image collection apparatus to the object;

determine an object region of the object from the first image, wherein the object region is the smallest rectangle enclosing the object; and determine the first distance of the object based on a lower edge location of the object region and a lower edge location of the first image.

14. The robot according to claim 13, wherein the processor is specifically configured to:

determine a reference location from the first image as a coordinate origin;

select any point from a lower side of the smallest rectangle as a first reference point, and determine a second reference point on a lower edge of the first image based on the first reference point; and calculate the first distance of the object based on location coordinates of the first reference point and the second reference point.

15. The robot according to claim 14, wherein the processor is specifically configured to:

determine a baseline distance between the first image collection apparatus and the second image collection apparatus, and calculate the depth information of the object based on the baseline distance, the actual parallax distance, and a focal length, wherein the depth information of the object meets the following relationship:

$D=f*b/(b-d)$, wherein f is the focal length, b is the baseline distance, d is the actual parallax distance, and D is the depth information.

16. The robot according to claim 15, wherein the processor is further configured to:

calculate a distance between the object and a front edge of the self-mobile robot, wherein the distance between the object and a front edge of the self-mobile robot meets the following relationship:

$Z=D*\cos\theta-s$, wherein $\theta$ is an optical axis elevation angle of the first image collection apparatus, s is a distance between the first image collection apparatus and the front edge of the self-mobile robot, D is the depth information, and Z is the distance between the object and the front edge of the self-mobile robot.

17. The robot according to claim 13, wherein the processor is specifically configured to:

obtain a field-of-view image by using the first image collection apparatus; and obtain the first image with the object by performing quality detection on the field-of-view image and deleting a frame without the object.

18. The robot according to claim 17, wherein the processor is specifically configured to:

perform edge filtering on the field-of-view image in a first direction, and project a filtered image in a second direction perpendicular to the first direction;

select a maximum value of a projected one-dimensional image signal; and when the maximum value is less than a preset threshold, determine the field-of-view image as the frame without the object, and delete the frame without the object; or when the maximum value is greater than or equal to the preset threshold, determine the field-of-view image as a frame with the object, and retain the frame with the object.

\* \* \* \* \*